United States Patent
Ham

(10) Patent No.: US 6,674,843 B1
(45) Date of Patent: Jan. 6, 2004

(54) APPARATUS SYSTEM AND METHOD FOR ENABLING MULTI-FREQUENCY COMMUNICATION OVER A TELEPHONE NETWORK HAVING A BILLING/TAX TONE

(75) Inventor: Ronald E. Ham, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/322,330

(22) Filed: May 28, 1999

(51) Int. Cl.$^7$ ............................................. H04M 11/06
(52) U.S. Cl. ..................... 379/93.01; 370/493; 370/496
(58) Field of Search ....................... 379/93.01; 370/493, 370/494, 495

(56) References Cited

U.S. PATENT DOCUMENTS 3,781,718 A  * 12/1973 Gittinger ..................... 333/118
5,712,977 A  *  1/1998 Glad et al. ................ 379/93.29
5,757,803 A  *  5/1998 Russell et al. ............... 370/494

OTHER PUBLICATIONS

Orckit Communications, "G. Lite White Paper" at Internet, www.orchit.com/glite3.html, Printed May 28, 1999.
Orckit Communications, "How Does ADSL Work" at Internet, www.orckit.com/how_does_ads_works.html, Printed May 28, 1999.
Orckit Communications, "How Does ADSL Work 3" at Internet, www.orckit.com/how_does_ads_works3.html, Printed May 28, 1999.

Pending Patent Application: Ronald E. Ham; "System and Method for Processing an Input Signal Carried on a Telephone Line"; Cisco Technology, Inc., Filed May 28, 1999.

* cited by examiner

*Primary Examiner*—Forester W. Isen
*Assistant Examiner*—Daniel Swerdlow
(74) *Attorney, Agent, or Firm*—Baker Botts L.L.P.

(57) ABSTRACT

An apparatus, system, and method for enabling multi-frequency communication over a telephone network having a billing/tax tone are disclosed. The apparatus comprises a connection port operable to couple to a telephone network. An output port is coupled to the input port, and is operable to couple to a high frequency device. A trap is coupled between the connection port and the output port. The trap is tuned to isolate the high frequency device from the telephone network at a specified frequency range.

23 Claims, 3 Drawing Sheets

APPARATUS SYSTEM AND METHOD FOR ENABLING MULTI-FREQUENCY COMMUNICATION OVER A TELEPHONE NETWORK HAVING A BILLING/TAX TONE

TECHNICAL FIELD OF THE INVENTION

The present invention relates in general to multi-frequency communications and, more particularly, to an apparatus, system, and method for enabling multi-frequency communication over a telephone network having a billing/tax tone.

BACKGROUND OF THE INVENTION

The Public Switched Telephone Network (PSTN) was originally designed for carrying analog voice communication signals. The typical PSTN network includes numerous central offices. Communication between the central offices can be accomplished through high speed switched digital links. Local loops couple the central offices to the customer premises. The local loops can be analog networks of twisted pair copper wiring. These local loops are often referred to as the Plain Old Telephone System (POTS) network. A "customer premises network," "premises network," or "premises wiring" connects electronic devices within the customer premises to the local loop. A typical premises network includes twisted pair copper wiring coupled to RJ-11 phone jacks. As used herein, "telephone network" refers to the network as a whole, including the central offices, local loops, and premises networks.

Digital Subscriber Line (xDSL) technology can apportion the transmission of data over a POTS network into a voice channel and a digital channel. The voice channel can include signals below 4 kHz while the digital channel can include signals above 4 kHz. For example, Asymmetric Digital Subscriber Line (ADSL) technology apportions the voice channel as 500 Hz to 3.5 kHz and the digital channel as 25 kHz to 2 MHz. As such, xDSL can provide a method to increase the bandwidth of the existing telephone network infrastructure.

Furthermore, xDSL technology can allow conventional devices that use the voice channel, and high frequency devices xDSL devices such as xDSL transceivers, to couple to the same POTS network and communicate simultaneously, using the respective channels. Conventional electronic devices, include low frequency devices such as telephones, facsimile machines, and conventional computer MODEMs.

In order to allow a POTS network to simultaneously carry signals over the voice channel and the data channel, conventional xDSL installations typically employ one of two approaches to separate the two channels. One objective of each system is to isolate the low frequency devices from the large high frequency output of the high frequency devices. This isolation prevents disruption of communication over the voice channel.

The first approach includes using multiple splitters. At both the central office and the customer's premises, a plain old telephone service splitter (POTS splitter) receives an input signal from a telephone line and separates a telephone signal (on the voice channel) and a data signal (on the data channel) from the input signal. The conventional POTS splitter includes a low-pass filter for separating the telephone signal from the input signal, and a high-pass filter for separating the data signal from the input signal. For example, in a typical ADSL installation, the low-pass filter of the conventional POTS splitter can pass frequencies below 4 kHz to the low frequency devices, while the high-pass filter can pass frequencies above 25 kHz to the high frequency devices.

A second conventional approach for separating the voice channel from the digital channel involves using a distributed filter at the customer premises end of an xDSL network. With a distributed filter architecture, a microfilter, is coupled between the premises network and each low frequency device that uses signals in the voice channel. For example, each telephone, facsimile machine, and other conventional telephony device would be coupled first to a microfilter filter which would then be coupled to the telephone network of the customer premises (e.g., via a standard telephone line). Typically, each microfilter includes a low pass filter that allows signals in the voice channel to travel to and from the low frequency devices, while filtering out traffic and noise caused by high frequency devices using the digital channel. In this scheme, devices using the digital channel, such as xDSL transceivers, can connect directly to the premises network.

The distributed or microfilter approach provides advantages over the POTS splitter approach by eliminating the need for installation of a POTS splitter at the customer premises. This eliminates the costly "truck roll" to the customer premises, and makes the implementation of an xDSL network more economically feasible.

Problems result from both the POTS splitter and the distributed filter approaches if a telephone network uses frequency bands other than the voice channel to communicate with the low frequency devices. For example, in many European markets, a telephone network communicates a billing/tax tone to the frequency devices, typically over a 12 kHz or 16 kHz frequency. As used herein, billing/tax tone refers to a signal communicated to a low frequency device over a frequency outside the voice channel. Billing/tax tone frequency is the frequency at which the billing/tax tone is communicated.

A conventional POTS splitter or microfilter using a low-pass filter tuned at 4 kHz will prevent the billing/tax tone from reaching the low frequency equipment. Therefore, the conventional POTS splitters and microfilters cannot be employed in such an environment.

Additionally, telecommunication equipment manufacturers have been unable to design a cost-effective POTS splitter or microfilter to efficiently separate the various signals. Therefore, conventional approaches fail to enable the development of an xDSL network over telephone networks having billing/tax tones.

SUMMARY OF THE INVENTION

In accordance with the present invention, an apparatus, system, and method for enabling multi-frequency communication over a telephone network having a billing/tax tone are disclosed that provide significant advantages over prior developed systems. The present invention solves problems presented by the disruptive interaction of high frequency devices and low frequency devices at frequency ranges typically used for billing/tax tones.

According to one aspect of the present invention, an apparatus comprises a connection port operable to couple to a telephone network. An output port is coupled to the input port, and is operable to couple to a high frequency device. A trap is coupled between the connection port and the output port. The trap is tuned to isolate the high frequency device from the telephone network at a specified frequency range.

According to another of the present invention, a method includes receiving an input signal over a telephone network and isolating a high frequency device from the telephone network at a specified frequency range of the input signal.

According to a further aspect of the present invention, a system comprises a trap operable to couple between a telephone network and a high frequency device. The trap is tuned to isolate the high frequency device from the telephone network at a specified frequency. The system further comprises a filter is operable to couple between the telephone network and a low frequency device. The filter is tuned to isolate the low frequency device from the telephone network at a frequency above the specified frequency.

It is a technical advantage of the present invention that it prevents parasitic capacitance of a high frequency device, such as an xDSL transceiver, from attenuating a billing/tax tone at the specified frequency range. Therefore, multi-frequency communication, such as xDSL communication, is enabled over a telephone network having a billing/tax tone.

It is another technical advantage of the present invention that it allows for a distributed filter architecture at the customer premises end of an xDSL network. The invention eliminates an expensive "truck roll" to each customer premises and enables the use of relatively inexpensive micro-filters. An xDSL network is therefore much more economically feasible in countries having a telephone network that uses a billing/tax tone.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The discussion below concerns embodiments with respect to Asymmetric Digital Subscriber Line (ADSL) technology. However, the present invention contemplates applicability to other current or future digital subscriber line (xDSL) technologies, or other multi-frequency communication technologies.

The discussion below further concerns deployment of embodiments of the present invention at the customer premises end of an xDSL network. However, the present invention is equally applicable to the central office end of an xDSL network.

Figure 1:
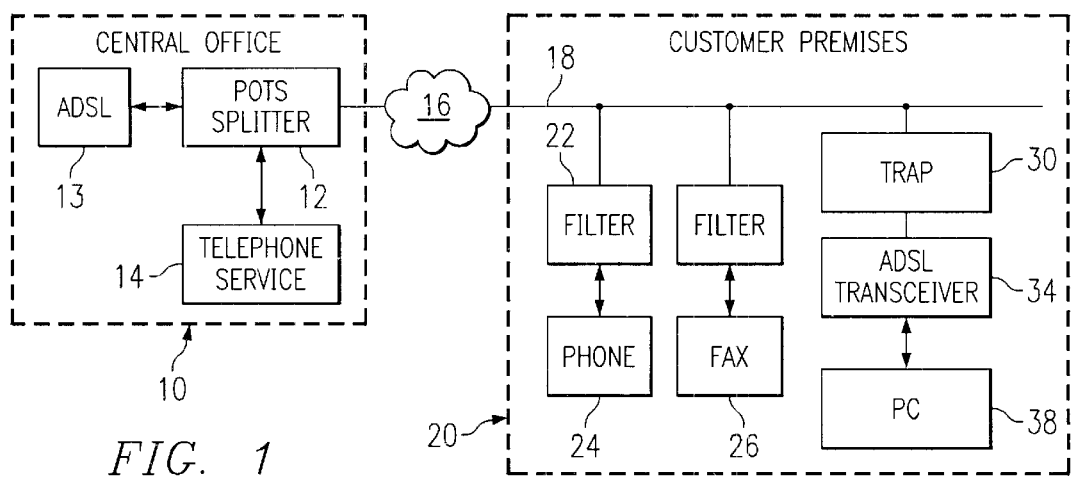
FIG. 1 is a block diagram of one embodiment of an ADSL installation having distributed trap and filters to enable multi-frequency communication over a telephone network having a billing/tax tone.

FIG. 1 is a block diagram of one embodiment of an ADSL installation having distributed trap and filters to enable multi-frequency communication over a telephone network having a billing/tax tone. A central office 10 is coupled to a customer premises 20 through the plain old telephone system (POTS) network 16, otherwise known as the local loop. Central office 10 includes a POTS splitter 12 coupled to POTS network 16. POTS splitter 12 can separate the signal on POTS network 16 into ADSL traffic 13 and regular telephone service traffic 14. For example, regular telephone traffic 14 can comprise signals below 4 kHz, while ADSL traffic 13 could comprise signals at a range above 4 kHz. Specifically, ADSL traffic 13 usually comprises signals at a frequency range of 25 kHz to 2 MHz.

At customer premises 20, POTS network 16 is coupled to premises network 18. Premises network 18 can comprise, for example, twisted pair copper wiring. In the embodiment of FIG. 1, filters 22 are coupled between premises network 18 and low frequency devices such as a telephone 24 and a facsimile machine 26. Filter 22 includes a filter input port operable to couple to premises network 18 and a filter output port operable to couple to phone 24 and facsimile machine 26. Such ports could comprise, for example, female RJ11 phone jacks or equivalent jacks.

Further according to the embodiment of FIG. 1, a trap 30 couples between premises network 18 and an ADSL transceiver 34. Trap 30 includes a connection port operable to couple to premises network 18 and an output port operable to couple to ADSL transceiver 34. Such ports could comprise, for example, female RJ11 phone jacks or equivalent jacks. ADSL transceiver 34 is coupled in turn to a personal computer (PC) 38.

In operation, the ADSL protocol separates the available bandwidth on POTS network 16 into a voice channel below 4 kHz and a digital channel between approximately 25 kHz and 2 MHz. With such an installation, a user can communicate with telephone 24 over POTS network 16, while simultaneously transmitting or receiving data over POTS network 16 with the use of ADSL transceiver 34. For example, the user may use PC 38 in combination with ADSL transceiver 34 to communicate with other devices over the internet.

Central office 10 additionally communicates a billing/tax tone over a billing/tax tone frequency to telephone 24 and facsimile machine 26. Central office 10 uses a billing/tax tone frequency above the voice channel. For example, the telephone network represented by FIG. 1 can be a European telephone network, which often uses a billing/tax tone frequency of 12 kHz or 16 kHz.

The installation of FIG. 1 is a distributed system. In such an installation, a filter 22 couples between each low frequency device and premises network 18. Filters 22 attenuate the signal input to telephone 24 and facsimile machine 26 above a specified frequency range. Filters 22 thus isolate telephone 24 and facsimile machine 26 from the high frequency output of ADSL transceiver 34, and thereby eliminate the disruption to regular telephone service caused by such high frequency output. Additionally, filters 22 allow the billing/tax tone from central office 10 to propagate to telephone 24 and facsimile machine 26.

In the embodiment of FIG. 1, filters 22 comprise low-pass filters tuned with a cutoff frequency set above the billing/tax tone frequency used by central office 10. Filters 22 thus allow the billing/tax tone to propagate to and from telephone 24 and facsimile machine 26. Additionally, since the billing/tax tone frequency is higher than the voice channel, filters 22 allow signals in the voice channel to propagate to and from the low frequency devices. Alternatively, filters 22 could comprise dual pass-band filters with a first pass-band set to below 4 kHz and a second pass-band set to the billing/tax tone frequency.

Similarly, trap 30 couples between each ADSL transceiver 34 and premises network 18. Trap 30 is tuned to isolate ADSL transceiver 34 from premises network 18 at a specified frequency range. In the embodiment of FIG. 1, trap 30 is tuned to isolate ADSL transceiver 34 from premises network 18 at a frequency range approximately equal to the billing/tax tone frequency used by central office 10. In the embodiment of FIG. 1, trap 30 comprises a high-Q series trap tuned to present a high impedance at the billing/tax tone frequency.

Trap 30 prevents a problem associated with telephone networks using a billing/tax tone. ADSL transceiver 34 places a parasitic capacitance of approximately 25 to 50 nF across premises network 18. At low frequencies, the parasitic capacitance is not problematic. However, the parasitic capacitance attenuates a signal at higher frequencies. The size of the parasitic capacitance in a conventional telephone circuit with a nominal impedance of 600 Ω limits the cutoff frequency of filter 22 to approximately 8 kHz. At 8 kHz frequencies, the parasitic capacitance of ADSL transceiver 34 unacceptably attenuates the signal to telephone 24. Since the billing/tax tone frequency is higher than the 8 kHz nominal limit, at the billing/tax tone frequency, the parasitic capacitance of ADSL transceiver will improperly attenuate the signal. Trap 30 eliminates this problem by isolating ADSL transceiver 34 from premises network 18 of the billing/tax tone frequency, preventing ADSL transceiver 34 from alternating the billing/tax tone.

Figure 2:
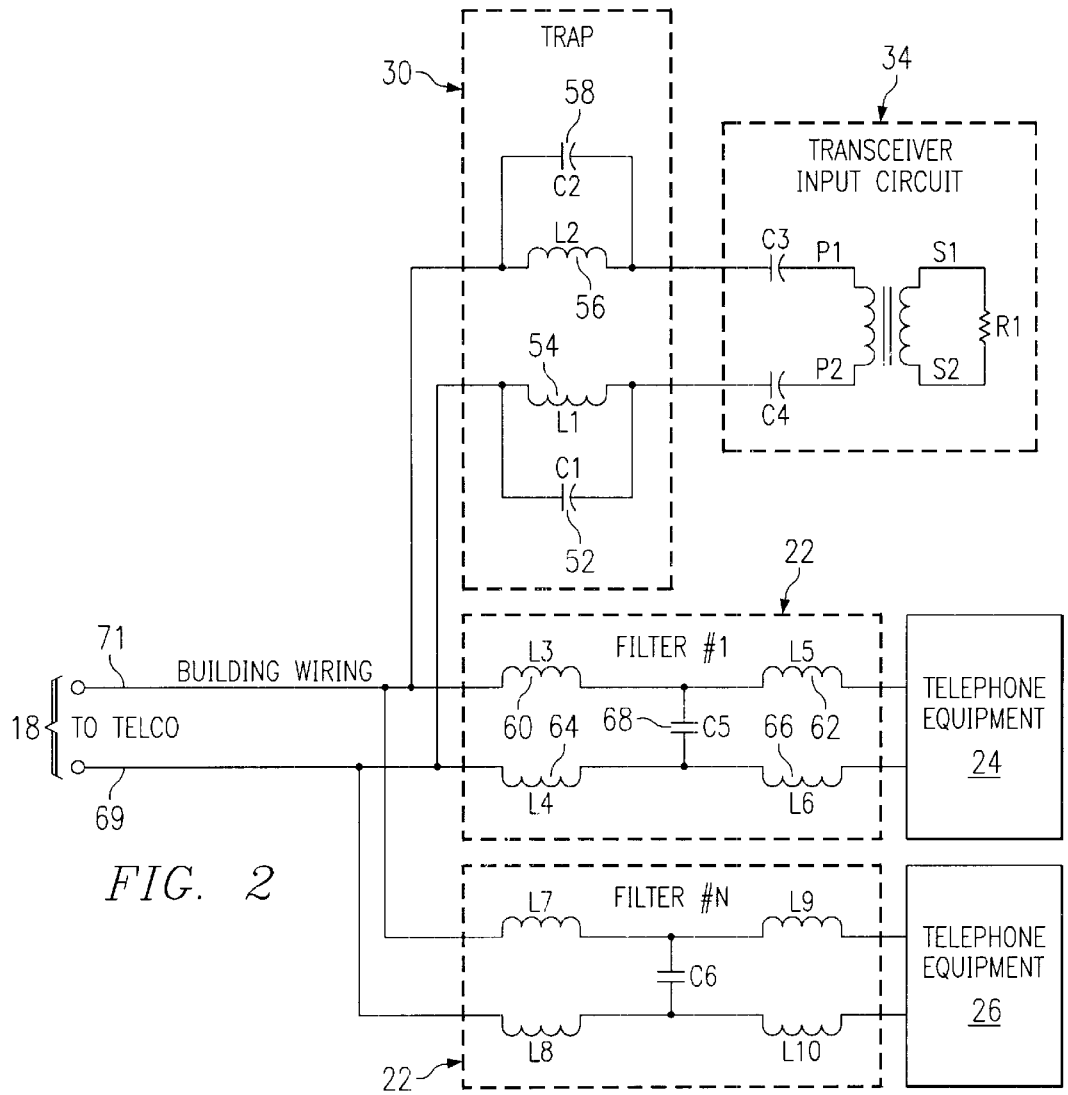
FIG. 2 is a circuit diagram of one embodiment of a system having distributed trap and filters to enable multi-frequency communication over a telephone network having a billing/tax tone.

FIG. 2 is a circuit diagram of one embodiment of a system having distributed trap and filters to enable multi-frequency communication over a telephone network having a billing/tax tone.

In the embodiment of FIG. 2, premises network 18 comprises twisted pair wiring, including a first wire 69 and a second wire 71. Trap 30 couples between premises network 18 and ADSL transceiver 34. Filters 22 couple between premises network 18 and low frequency equipment such as telephone 24 and facsimile machine 26.

In operation, premises network 18 couples to a central office, for example through POTS network 16, as described with respect to FIG. 1. ADSL protocol separates the available bandwidth on POTS network into a voice channel between 500 Hz and 3.5 kHz, and a data channel between 25 kHz and 2 MHz. Low frequency equipment such as telephone 24 and facsimile machine 26 communicate over premises network 18 to the central office and beyond using the voice channel. Additionally, a billing/tax tone is communicated to telephone 24 and facsimile 26 at a frequency above the voice channel. In the embodiment of FIG. 2, the billing/tax tone frequency is approximately 12 kHz.

Further in operation, ADSL transceiver 34 communicates via premises network 18 using a higher frequency signal. For example, ADSL communication can operate using frequencies from 25 kHz to 2 MHz.

Trap 30 is tuned to isolate ADSL transceiver 34 from premises network 18 at the billing/tax tone frequency. As discussed with respect to FIG. 1, trap 30 prevents ADSL transceiver 34 from attenuating the billing/tax tone presented to telephone 24.

In the embodiment of FIG. 2, trap 30 comprises a high Q series trap tuned to present a high impedance at the billing/tax tone frequency. Trap 30 includes a first capacitive element 52 and a first inductive element 54 coupled in parallel to first wire 69. A second capacitive element 58 and a second inductive element 56, couple in parallel to second wire 71. In the embodiment of FIG. 2, first and second capacitive elements 52 and 58 comprise 390 nF capacitors. First and second inductive elements 54 and 56 comprise 450 $\mu$H inductors.

Capacitive elements 52 and 58 coupled in parallel to inductive elements 54 and 56 operate to impede current at a specified frequency, which for the values shown is approximately 12 kHz. Thus, trap 30 isolates ADSL transceiver 34 from premises network 18 at the billing/tax tone frequency. In turn, this prevents ADSL transceiver 34 from bridging premises network 18 at the billing/tax tone frequency and attenuating the billing tax/tone to telephone 24 and facsimile machine 26.

Further in operation, filters 22 isolate telephone 24 and facsimile machine 26 from premises network 18 at frequencies above the billing/tax tone frequency. Filters 22 thus prevent the high frequency traffic from ADSL transceiver 34 from disrupting communication in the voice channel.

In the embodiment of FIG. 2, filters comprise inductive elements 64 and 66 coupled in series to first wire 69. Inductive elements 60 and 62 couple in series to second wire 71. Capacitive element 68 couples between first wire 69 and second wire 71 as shown. Inductive elements 64, 66, 60, and 62 comprise 7.4 $\mu$H inductors, as shown. Capacitive element 68 comprises a 20.5 nF capacitor. At low frequencies, inductive elements 60, 62, 64, and 66 present little impedance to current flowing to telephone 24. However, at frequencies higher than 12 kHz, inductive elements 60, 62, 64, and 66 impede the current flow which acts to attenuate the signal from premises network 18 to telephone 24. Thus, filter 22 comprises a low pass filter with a cutoff frequency of approximately 12 kHz.

The embodiment of FIG. 2 is a distributed system. Trap 30 and filters 22 are packaged separately and connect to high frequency and low frequency equipment, respectively. For example, trap 30 includes a connection port for connecting to premises network 18 and an output port for connecting to ADSL transceiver 34. Similarly, each filter 22 includes a filter input port for connecting to premises network 18, and a filter output port for connecting to telephone 24 or facsimile machine 26.

Figure 3A:
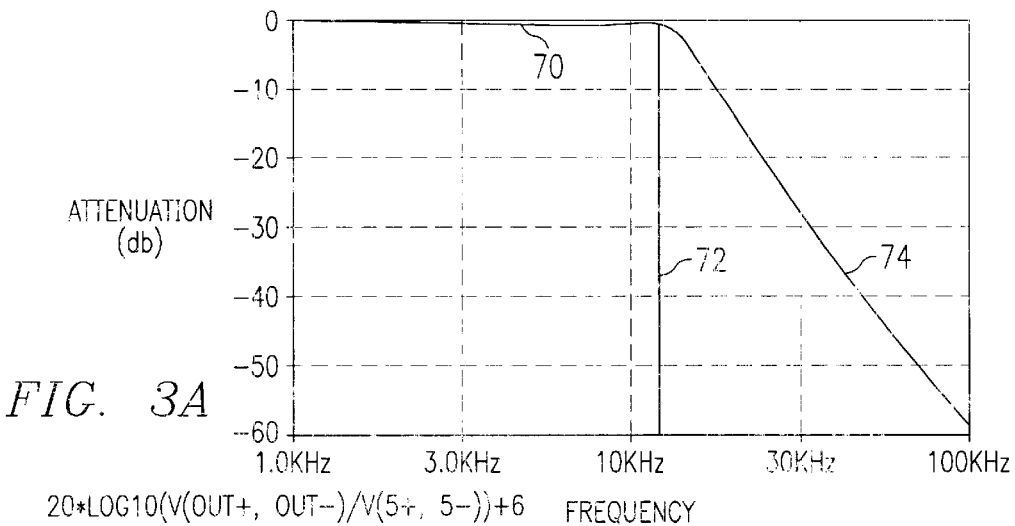
FIGS. 3A through 3C are plots of responses of circuits with and without a trap and filter for enabling multi-frequency communication over a telephone network having a billing/tax tone.
Figure 3B:
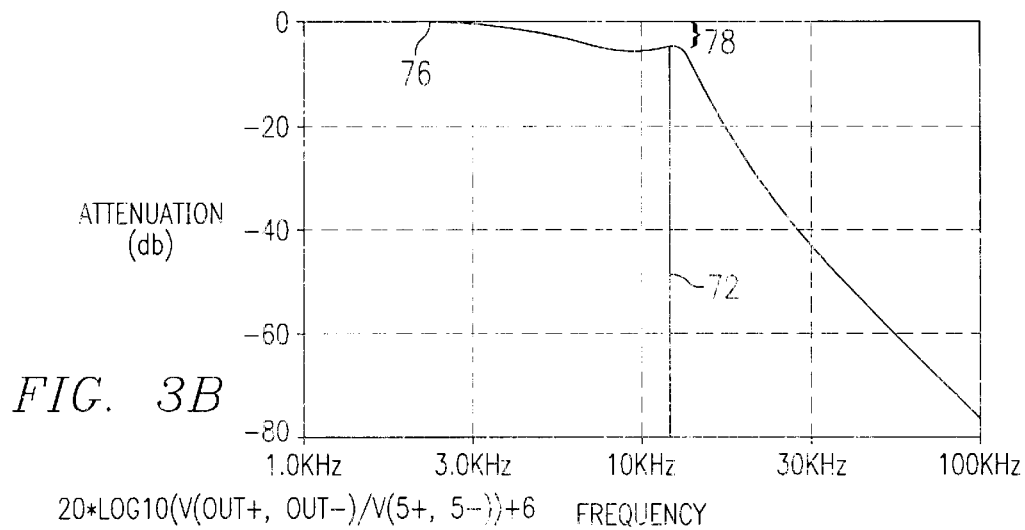
Figure 3C:
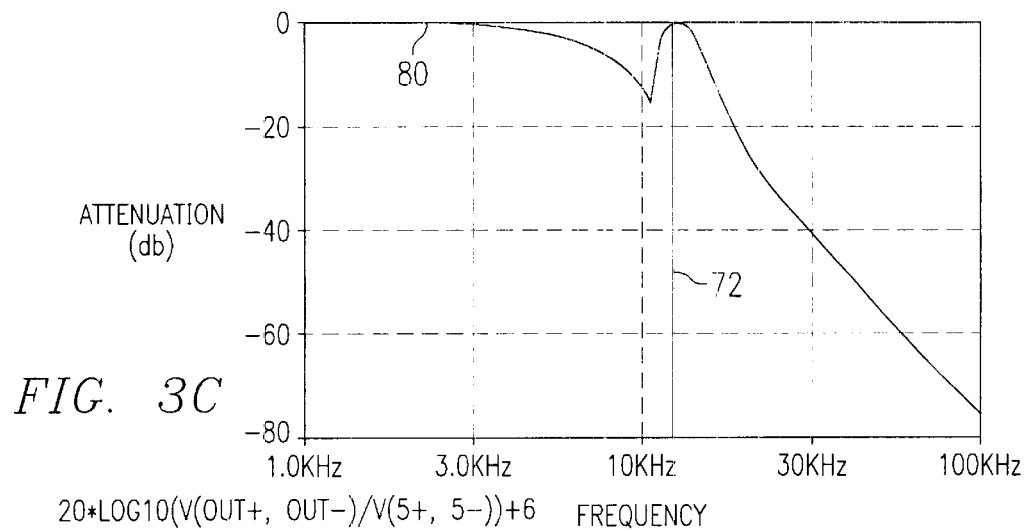

FIGS. 3A through 3C are plots of responses of circuits with and without a trap and filter for enabling multi-frequency communication over a telephone network having a billing/tax tone. FIG. 3A plots the circuit response of a circuit including a low pass filter 22 as described in FIG. 2 coupled to a premises network. The circuit plotted in FIG. 3A does not include an ADSL transceiver.

Area 70 shows that there is little or no attenuation of the input signal up to a specified frequency 72. Specified frequency 72 is set to 12 kHz, a typical billing/tax tone frequency. After the input signal reaches specified frequency 72, the response begins to roll off as shown by range 74. In other words, the filter attenuates the signal above 12 kHz.

FIG. 3B is a plot of a circuit response of a system including a single filter and an ADSL transceiver coupled to premises network. The system plotted by the circuit response of FIG. 3B does not include a trap coupled between the ADSL transceiver and the premises network. As such, FIG. 3B shows the problem discovered and solved by the present invention. Area 76 shows that the input signal becomes attenuated as the frequency of the input signal rises. At a specified frequency 72, the attenuation 78 is greater than 3 dB. As such, with the system plotted by FIG. 3B, the billing/tax tone will not properly be communicated to a telephone.

The cause of this attenuation as discussed earlier, is the parasitic capacitance of the ADSL transceiver. At higher frequencies, the ADSL transceiver bridges the premises network.

FIG. 3C is a plot of a circuit response of a system including a single filter coupled between a telephone and a premises network and a trap coupled between an ADSL transceiver and the premises network. As in the plot of FIG. 3B, at area 80 the input signal becomes attenuated at higher frequency. However, at the specified frequency 72, the series trap isolates the ADSL transceiver from the premises network. This in turn prevents the ADSL transceiver from bridging the premises network and attenuating the input signal. Therefore, at the specified frequency, the input signal is properly communicated to the telephone.

Figure 4:
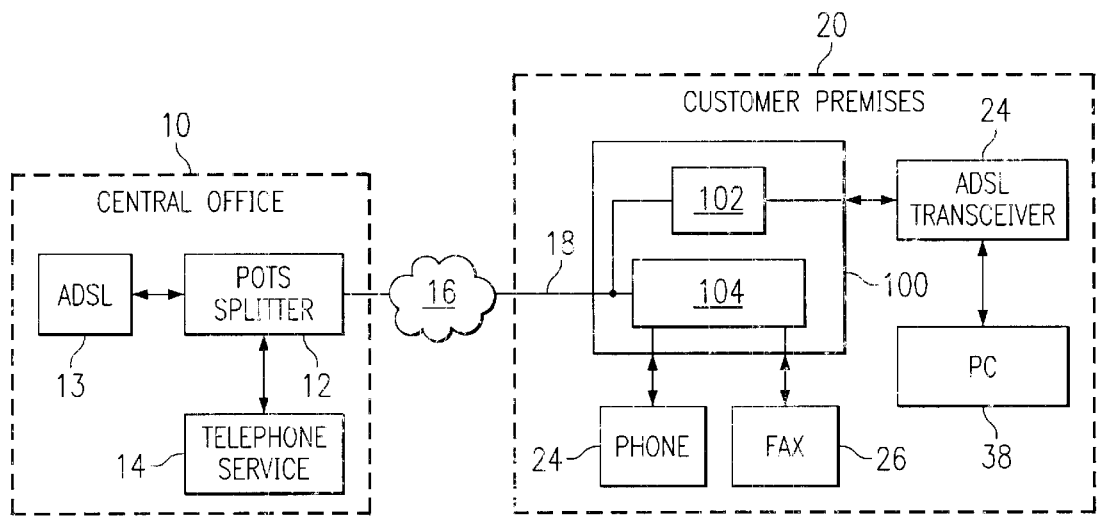
FIG. 4 is a block diagram of one embodiment of an ADSL installation having an integrated trap and filter to enable multi-frequency communication over a network having a billing/tax tone.

FIG. 4 is a block diagram of one embodiment of an ADSL installation having an integrated trap and filter to enable multi-frequency communication over a network having a billing/tax tone. The elements of the installation are similar to those as discussed with respect to FIG. 1. Central office 10 couples to customer premises 20 through a POTS telephone network 16. Central office 10 includes POTS splitter 12 which separates a signal on POTS network 16 into ADSL traffic 13 and telephone service traffic 14.

At customer premises 20, premises network 18 couples to POTS telephone network 16. Premises network 18 carries an input signal to and from POTS network 16. A trap/filter 100 couples to premises network 18. Low frequency equipment such as telephone 24 and facsimile machine 26 each couple to trap/filter 100. ADSL transceiver 24 also couples to trap/filter 100 and personal computer 38.

Trap/filter 100 includes a filter 104 and a trap 102 integrated into a single package. Trap 102 can comprise, for example, a high Q series trap tuned to present a high impedance at a specified frequency. Filter 104 can comprise a low pass filter with a cutoff frequency set approximately at or above the same specified frequency. For the operation of the embodiment of FIG. 4, this specified frequency is the billing/tax tone frequency used by central office to communicate a billing/tax tone.

In operation, trap/filter 100 performs the operation of trap 30 and filter 22 of FIG. 1. Namely, filter 104 isolates ADSL transceiver from premises network 18 at the billing/tax tone frequency used by central office 10 to communicate a billing/tax tone to telephone 24. Filter 104 isolates telephone 24 and facsimile machine 26 from premises network at frequencies above the billing/tax tone frequency.

Figure 5:
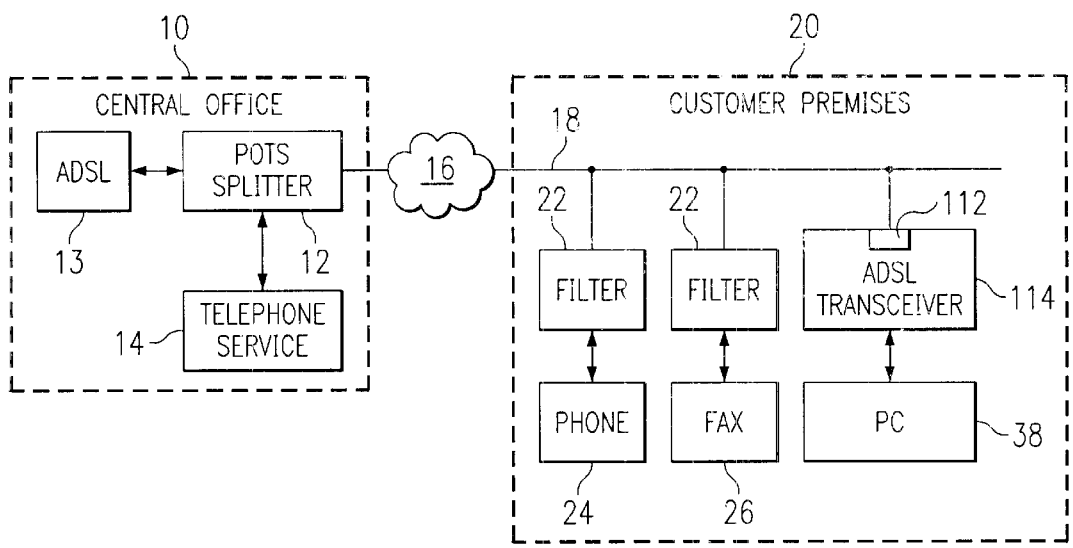
FIG. 5 is a block diagram of one embodiment of an ADSL installation having an ADSL transceiver with an integrated trap that enables multi-frequency communication over a network having a billing/tax tone.

FIG. 5 is a block diagram of one embodiment of an ADSL installation having an ADSL transceiver with an integrated trap that enables multi-frequency communication over a network having a billing/tax tone. The embodiment of FIG. 5 is similar in operation to the embodiment of FIG. 4 and FIG. 1. However, in the embodiment of FIG. 5, ADSL transceiver 114 couples directly to premises network 18. ADSL transceiver 114 includes an integrated trap 112. In operation, integrated trap 112 performs the operation of trap 30 of FIG. 1 and trap 102 of FIG. 4. Trap 112 prevents the parasitic capacitance of ADSL transceiver 114 from attenuating a billing/tax tone from central office 14 to telephone 24 or facsimile machine 26, and thus trap 112 enables multi-frequency communication on premises network 18.

The embodiments discussed with respect to FIGS. 1 through 5 display the present invention deployed at the customer premises end of a telephone network. However, as previously indicated, the present invention contemplates that various embodiments may deployed at the central office portion of a telephone network. For example, referencing FIG. 1, trap 30 and filters 22, or trap/filter 100 of FIG. 4 may replace the functionality of POTS splitter 12 in central office 10 of FIG. 1. Alternatively, further referencing FIG. 1, ADSL transceiver 114 with trap 112 of FIG. 4 may be deployed to receive ADSL traffic 13 at central office 10.

Additionally, a typical central office couples to many customer premises networks, necessitating the use of large numbers of traps 30 and filters 22 or trap/filters 100. Therefore, when deployed in a central office, several traps 30 and filters 22 or trap/filters 100 can be integrated together. For example, multiple traps 30 and filters 22 could be imprinted on Printed Circuit Boards (PCBs) and placed in racks for such a deployment.

Although the present invention has been described in detail, it should be understood that various changes, substitutions and alterations can be made thereto without departing from the spirit and scope of the invention as defined by the appended claims.

What is claimed is:

1. An apparatus for enabling multi-frequency communication, comprising:
 a connection port operable to couple to a telephone network;
 an output port coupled to the connection port, the output port operable to couple to a high frequency device; and
 a trap coupled between the connection port and the output port, the trap tuned to isolate the high frequency device from the telephone network at a specified frequency range, and wherein the trap is operable to isolate the high frequency device from the telephone network such that attenuation of an input signal in the specified frequency range is less than 3 dB.

2. The apparatus of claim 1, wherein the specified frequency range comprises a range within approximately 3.5 kHz to approximately 25 kHz.

3. The apparatus of claim 1, wherein the high frequency device comprises an ADSL transceiver.

4. The apparatus of claim 1, wherein the trap comprises a high-Q series trap tuned to present a high impedance at the specified frequency range.

5. The apparatus of claim 1, wherein the specified frequency range comprises a frequency at which a billing/tax tone is communicated over the telephone network.

6. The apparatus of claim 1, wherein the specified frequency range is approximately 12 kHz +/−1%.

7. The apparatus of claim 1, wherein the specified frequency range is approximately 16 kHz +/−1%.

8. The apparatus of claim 1, wherein the connection port comprises a female RJ-11 jack.

9. The apparatus of claim 1, wherein the connection port is operable to couple to twisted pair wiring.

10. The apparatus of claim 9, wherein the trap comprises:
 a first inductive element coupled to the connection port;
 a first capacitive element coupled to the connection port in parallel with the first inductive element;
 a second inductive element coupled to the connection port; and a second capacitive element coupled to the connection port in parallel with the second inductive element;

such that when the connector port is coupled to the twisted pair wiring, the first inductive element and the first capacitive element are coupled to a first wire of the twisted pair wiring, and the second inductive element and the second capacitive element are coupled to a second wire of the twisted pair wiring.

11. The apparatus of claim 10, wherein the first and second capacitive elements comprise capacitors of approximately 390 nF.

12. The apparatus of claim 10, wherein the first and second inductive elements comprise inductors of approximately 450 microHenries.

13. The apparatus of claim 1, wherein there is one specified frequency range.

14. The apparatus of claim 1, further comprising:

a filter output port operable to couple to a low frequency device; and a filter coupled between the connection port and the filter output port, the filter tuned to isolate the low frequency device from the premises network above the specified frequency range.

15. The apparatus of claim 14, wherein the filter output port is operable to couple to a telephone.

16. The apparatus of claim 14, wherein the connection port, the trap, the output port, and the filter output port are integrated into a single package.

17. The apparatus of claim 14, wherein the filter comprises a low pass filter.

18. The apparatus of claim 14, wherein the filter comprises a filter with a first pass band and a second pass band, the first pass band below the specified frequency range, and the second pass band approximately equal to the specified frequency range.

19. The apparatus of claim 18, wherein the first pass band is below approximately 3.5 kHz, and the second pass band is approximately 12 kHz +/−1%.

20. The apparatus of claim 18, wherein the first pass band is below approximately 3.5 kHz, and the second pass band is approximately 16 kHz +/−1%.

21. The apparatus of claim 1, further comprising:

a filter input port operable to couple to the telephone network;

a filter output port operable to couple to a low frequency device; and a filter coupled between the connection port and the filter output port, the filter tuned to isolate the low frequency device from the telephone network above the specified frequency range.

22. The apparatus of claim 21, wherein the connection port, the trap, and the output port are integrated into a first package, and further wherein the filter input port, the filter output port, and the filter are integrated into a second package.

23. The apparatus of claim 1, wherein the connection port, the trap, and the output port and the high frequency device are integrated into a single package.

* * * * *